United States Patent
Martineck, Sr.

(10) Patent No.: US 11,167,579 B2
(45) Date of Patent: Nov. 9, 2021

(54) SYSTEM AND METHOD FOR REMOTE DISPLAY OF SCRATCH-OFF LOTTERY TICKETS PRIOR TO SALE

(71) Applicant: Scientific Games International, Inc., Newark, DE (US)

(72) Inventor: Jeffrey D. Martineck, Sr., Johns Creek, GA (US)

(73) Assignee: Scientific Games International, Inc., Newark, DE (US)

( * ) Notice: Subject to any disclaimer, the term of this patent is extended or adjusted under 35 U.S.C. 154(b) by 181 days.

(21) Appl. No.: 16/547,780

(22) Filed: Aug. 22, 2019

(65) Prior Publication Data

US 2020/0070563 A1  Mar. 5, 2020

Related U.S. Application Data

(60) Provisional application No. 62/723,604, filed on Aug. 28, 2018.

(51) Int. Cl.
*B42D 25/27* (2014.01)
*A63F 3/06* (2006.01)
(Continued)

(52) U.S. Cl.
CPC ............ *B42D 25/27* (2014.10); *A63F 3/0655* (2013.01); *A63F 3/0665* (2013.01); *B42D 25/373* (2014.10); *B42D 25/378* (2014.10); *G06Q 20/202* (2013.01); *G06Q 20/208* (2013.01); *G06Q 50/34* (2013.01); *G07D 7/00* (2013.01); *G07D 7/004* (2013.01); *G07D 7/0054* (2017.05);
(Continued)

(58) Field of Classification Search
CPC .............................. G06Q 50/34; A63F 3/0665
See application file for complete search history.

(56) References Cited

U.S. PATENT DOCUMENTS 9,251,663 B1  2/2016  Sandvick
9,640,018 B2  5/2017  Finocchio et al.
(Continued)

FOREIGN PATENT DOCUMENTS

EP  0 721 849 A1  7/1996

OTHER PUBLICATIONS

EPO Search Report, dated Feb. 3, 2020.

*Primary Examiner* — Allen C Chein
(74) *Attorney, Agent, or Firm* — Dority & Manning, P.A.

(57) ABSTRACT

A method for providing scratch-off lottery tickets for sale remote from a POS location in a retail establishment includes configuring the tickets with a game play area having play characters covered by a scratch-off coating. A print characteristic is provided in the game play area that is optically scannable but not reproducible when photocopying the game play area. In a database, identification of the printed characteristic is linked to a computer file associated with the lottery ticket at a central lottery computer. An optically scannable random identifier is also provided in the game play area and is linked to the computer file. Upon presentation of the lottery ticket for purchase, the ticket or a scanned image of the ticket is analyzed to verify that the print characteristic is present in the game play area. The scanned image of the ticket is analyzed to verify that the random identifier assigned to the lottery ticket is present in the game play area of the scanned image.

15 Claims, 3 Drawing Sheets

(51) Int. Cl.

| | |
|---|---|
| *B42D 25/373* | (2014.01) |
| *G06Q 20/20* | (2012.01) |
| *G06Q 50/34* | (2012.01) |
| *B42D 25/378* | (2014.01) |
| *G07D 7/00* | (2016.01) |
| *G07D 7/202* | (2016.01) |
| *G07D 7/20* | (2016.01) |
| *G07D 7/2033* | (2016.01) |
| *G07D 7/005* | (2016.01) |
| *G07D 7/004* | (2016.01) |
| *G07F 17/32* | (2006.01) |

(52) U.S. Cl.
CPC ............... *G07D 7/20* (2013.01); *G07D 7/202* (2017.05); *G07D 7/2033* (2013.01); *G07F 17/329* (2013.01); *A63F 2003/0675* (2013.01); *A63F 2250/58* (2013.01)

(56) References Cited

U.S. PATENT DOCUMENTS

| | | | |
|---|---|---|---|
| 2002/0047259 A1* | 4/2002 | Lambert | ................ B41M 3/14 283/49 |
| 2008/0191460 A1* | 8/2008 | Blank | ................ B42D 15/025 283/72 |
| 2009/0167012 A1 | 7/2009 | Martineck, Sr. | |
| 2010/0190541 A1 | 7/2010 | Lazar | |

* cited by examiner

SYSTEM AND METHOD FOR REMOTE DISPLAY OF SCRATCH-OFF LOTTERY TICKETS PRIOR TO SALE

PRIORITY

The present application claims the benefit of Provisional Application No. 62/723,604, filed Aug. 28, 2018.

FIELD OF THE INVENTION

The present invention generally relates to a system and method for implementing a scratch-off ("instant") lottery ticket game, and more particularly to a method and system wherein the scratch-off lottery tickets can be displayed remotely from a point-of-sale terminal at a retail location prior to sale.

BACKGROUND

"Scratch-off" or "instant-win" lottery tickets have enjoyed immense popularity in the lottery industry for decades. These games offer distinct advantages to the lottery authorities and are attractive to a broad spectrum of players.

For security and other reasons, it has been the conventional practice that such lottery tickets are housed and dispensed at the point-of-sale ("POS") terminal at the respective retail establishment where they are dispensed by the retail clerk upon a specific request from a purchaser. The conventional "manual" dispensers require the retail clerk to manually grasp and pull the requested number of tickets from a bin mounted relatively close to the POS terminal. This process takes the clerk's time and attention from other responsibilities and customers, and the storage bins take up valuable space at or near the POS terminal and counter.

Electronic ticket dispenser arrays are being developed that are interfaced with a lottery terminal or POS terminal, wherein the tickets are automatically dispensed from a bin in the array upon receipt of dispense command entered by the clerk via the lottery terminal or POS terminal. Although providing increased functionality, these systems also require the clerk's time and attention to initiate the dispense sequence and are also placed at or near the POS counter.

An issue with placement of the scratch-off lottery tickets at a location within the retail establishment remote from the POS counter/terminal and accessible to purchasers has been the concern that unscrupulous persons acting in cohorts with the retail clerk will clandestinely play the tickets prior to actually paying for the tickets. Upon finding a winning ticket, the clerk will then go through the process of accepting payment and entering the ticket identification into the lottery system as if it had been legitimately purchased, wherein the ticket is then flagged as activated (e.g., paid-for and capable of being subsequently redeemed).

In another fraud scenario, a person(s) may make copies of the front of the scratch-off tickets via a high-quality printer. When a winning ticket is pre-screened without purchasing the ticket, such person presents the copy of the ticket to the clerk for purchase and activation, wherein upon scanning, the ticket copy appears to be legitimate to the system.

In still another fraud scenario, once a winning ticket is pre-screened without purchasing the ticket, the play area from another ticket is cut out and placed over the played area of the winning ticket, wherein the altered winning ticket is then presented for purchase and activation by the clerk. Again, upon scanning, the altered ticket contains the unique identifying information of the winning ticket and appears legitimate to the system.

U.S. Pat. No. 9,640,018 describes a system and method wherein a player is provided with a free pre-printed first game piece having a first set of game play data that is insufficient to ascertain an outcome of the lottery game. Responsive to receiving the indication that the player wishes to actually purchase the lottery ticket, the game outcome is then determined and a second set of game play data chosen based on the outcome, so that a comparison of the first set of game play data and the second set game play data is indicative of the game outcome. The second set of game data may be provided to the player on a second game piece also having data associating the second game piece with the first game piece and a unique identifier. When a claim for a prize is received from the player, the unique identifier may be used to confirm whether a prize is due the player.

The present system and method seek to provide a secure and reliable means to present and make scratch-off lottery tickets accessible to purchasers at a location remote from the POS counter/terminal that addresses the security concerns noted above.

SUMMARY

Objects and advantages of the invention will be set forth in part in the following description, or may be obvious from the description, or may be learned through practice of the invention.

In a particular embodiment of the present invention, a method is provided for providing scratch-off lottery tickets ("lottery tickets") for sale remote from a point-of-sale (POS) location in a retail establishment. At the retail establishment, the lottery tickets are provided in a manner accessible to the players, wherein the player physically retrieves the lottery ticket of their choice and presents the lottery ticket to a clerk or attendant at the POS station for purchase. For example, the lottery tickets may be provided on a rack in an aisle within the retail establishment remote from the POS station. In this manner, the clerk at the POS station need not be involved with the player's initial selection of a lottery ticket.

The method includes configuring the lottery tickets with a game play area having play characters covered by a scratch-off coating (SOC). As well-understood in the art, when uncovered, these play characters reveal to the player whether or not the lottery ticket is a winning ticket (and the prize amount). In the game play area of the lottery ticket, the method includes providing a print characteristic that is optically detectable upon being scanned but not reproducible when photocopying the game play area. There are different embodiments of this print characteristic within the scope of the invention, as described in greater detail below. This print characteristic that can be detected upon scanning, but not photocopied, deters a potential fraudster from making photocopies of illicitly obtained lottery tickets with the intent of submitting a photocopy of a pre-screened winning ticket for purchase. Identification of the print characteristic is liked to a computer file associated with the particular lottery ticket at a central lottery computer.

The method further includes, in the game play area, providing an optically scanable random identifier that is assigned to the lottery ticket, and linking the random identifier to the lottery ticket in the computer file. This random identifier is not readily visually discernable such that a person unaware of the use of such identifiers would not likely be able to discern one lottery ticket from another (in the same lottery game) by simple visual inspection of the lottery tickets. This feature of the lottery tickets and method according to aspects of the present invention deters the potential fraudster from cutting out the game play area from one ticket and attaching it over the game play area of an illegally pre-screened winning ticket in an attempt to fool the system into "seeing" an original untampered lottery ticket.

Upon presentation of the scratch-off lottery ticket for purchase, the method includes performing verification processes. First, a scanned image of the lottery ticket is analyzed to verify that the print characteristic is present in the scanned image. Second, the scanned image of the lottery ticket is analyzed to verify that the random identifier assigned to the scratch-off lottery ticket is present in the game play area of the scanned image.

As mentioned, the particular print characteristic may be one or a combination of different properties. In one embodiment, the print characteristic may be a reflective property provided by the use of metallic film or metallic ink printed in the game play area. The reflectivity property cannot be photocopied, but will present itself in conventional optical scanning processes wherein light is shined on the lottery ticket being digitized and reflected (usually through a series of mirrors and lenses) onto a photosensitive element, such as a light-sensing integrated circuit known as a charged coupled device (CCD). The amount of light reflected onto the photosensitive elements will be significantly greater than that from a copy of the lottery ticket without the reflective properties. A threshold light detection functionality can be integrated with the scanner to detect the amount of light that should be reflected from the reflective surfaces of the ticket.

In other embodiments, the print characteristic may be provided by an "invisible ink" that is not visual in the game play area, but reveals itself upon being activated in the scanning process that generates the scanned image. An example of such an ink is a phosphorescent ink that is activated by absorbing the light in the scanning process. Various types of invisible inks (also referred to as "security inks") are well-known, such as heat activated inks, and can be used in the present methods. In general, such inks are used to produce writing or images that cannot be seen until the document is heated, treated, or otherwise activated during or prior to the scanning process. Again, a detection functionality can be integrated with the scanner to detect that the activated feature is present on the scanned ticket.

Identification of the print characteristic can be stored in the ticket-specific computer file at the central lottery computer or, in an alternate embodiment, can be stored separate from the computer file and linked to a unique serial number or code provided on the scratch-off lottery ticket and associated with the computer file. Such identification may be in the form of an image, numerical value, or other suitable distinguishing information that can be used to confirm the presence of the print characteristic on the lottery ticket at the scanner or at the central lottery computer based on the scanned image.

In certain embodiments, the random identifier may be an alteration in a background image printed in the game play area that is unique to the scratch-off lottery ticket. For example, this alternation may be a change in color or pattern used in the background area, or the presence or absence of a mark or indicia, as compared to other lottery tickets within the common lottery game.

The method may include storing an image of the game play area with random identifier in the computer file associated with the particular lottery ticket at the central lottery computer. Alternatively, an image of the game play area with the random identifier may be stored separate from the computer file and accessed when verifying the scanned image of the game play area. For example, the separately-stored image of the game play area with random identifier may be linked to a unique serial number or code provided on the scratch-off lottery ticket, wherein the code or serial number is used to retrieve the image from the remote storage.

In a particular embodiment, a plurality of game play area templates are produced for a particular common game. For example, a "Lucky 7" common game (having a defined number of the scratch-off lottery tickets printed for such common game) may have ten different game play area templates, wherein each respective template has a different one or combination of the random identifiers. At the time of printing the lottery tickets, one of the game play area templates is assigned to each lottery ticket in a random or defined order, and the identity of the template is linked to the unique serial number or code in the computer file.

A scanner at the POS station may be used to generate the scanned image upon presentation of the lottery ticket for purchase by a player, wherein the scanner is in communication with the central lottery computer for receipt of the identification of the print characteristic from or associated with the computer file. In this embodiment, the process of analyzing the scanned image of the lottery ticket to verify presence of the print characteristic is done by an analysis functionality configured with the scanner. In addition, with this embodiment, the image of the game play area with the random identifier is saved in or associated with the computer file and is transmitted by the central lottery computer to the scanner for verification by the scanner that the random identifier assigned to the scratch-off lottery ticket is present in the game play area of the scanned image.

In an alternate embodiment, the scanner at the POS station generates and transmits the scanned image of the lottery ticket to the central lottery computer for verification by the central lottery computer of the print characteristic and that the random identifier assigned to the scratch-off lottery ticket is present in the game play area of the scanned image.

The print characteristic may, in certain embodiments, be printed on the SOC layer that covers all or a portion of the game play area on the scratch-off lottery ticket. Alternately, the print characteristic may be printed in a section of the game play area that is not covered by the SOC layer.

Likewise, the random identifier may be printed on the SOC layer in the game play area, or in a portion of the game play area not covered by the SOC layer.

The present invention also encompasses scratch-off lottery tickets that embody the characteristics discussed above and presented in greater detail below, wherein such tickets are particularly suited for presentation to potential consumers at a location in a retail establishment remote from the POS station.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Generally, the present disclosure is directed to a secure method for providing scratch-off lottery tickets at a location remote from the POS station. The lottery tickets can be provided in a manner accessible to the players without assistance or monitoring by personnel at the POS station, wherein the player physically retrieves the lottery ticket of their choice and presents the lottery ticket to the POS station for purchase. For example, the lottery tickets may be provided on a rack in an aisle within the retail establishment remote from the POS station. In this manner, the clerk at the POS station need not be involved with the player's initial selection of a lottery ticket.

Referring to the figures in general, individual scratch-off lottery tickets ("lottery tickets") 14 are specifically configured for use with method embodiments 10 (FIGS. 3 and 4) in accordance with aspects of the invention. Those skilled in the art appreciate that a set or production run of such tickets 14 are generally printed for a common game, for example the common game identified as "Winter Riches" in FIGS. 1 and 2, wherein the prize structure that generates the expected value for the common game is embodied by winning tickets 14 distributed throughout the ticket run.

Figure 1:
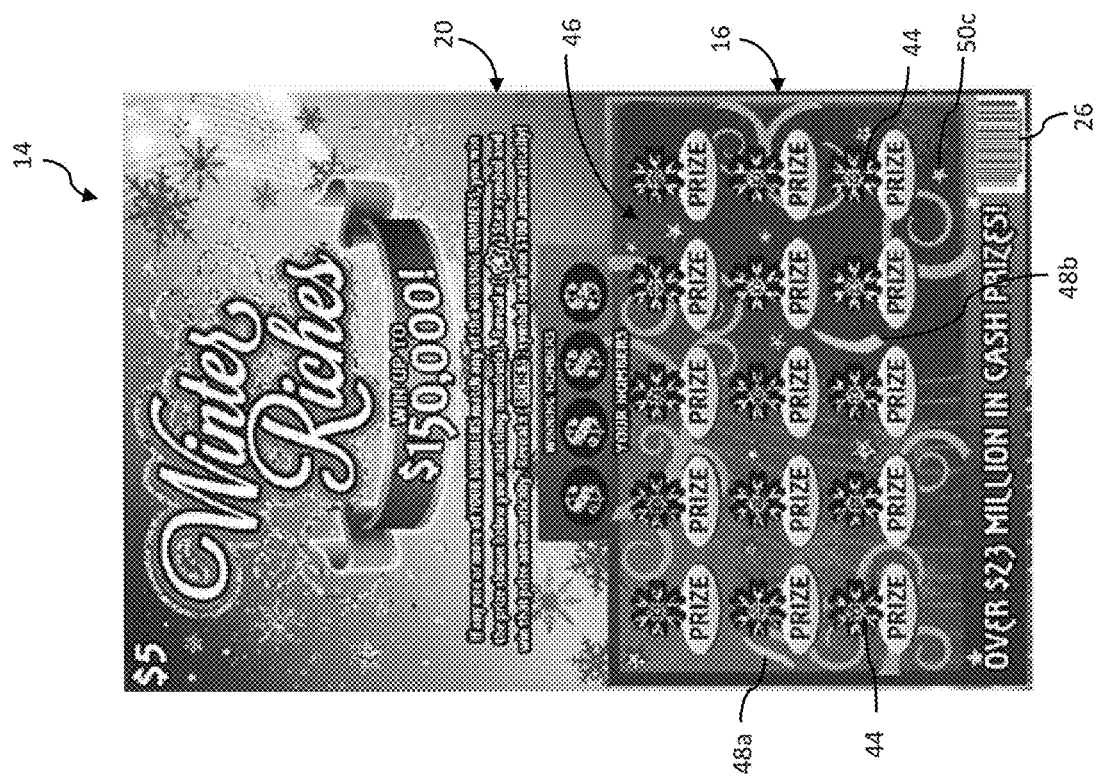
FIG. 1 depicts an embodiment of a scratch-off lottery ticket that may be used with the methods according to the present invention.
Figure 2:
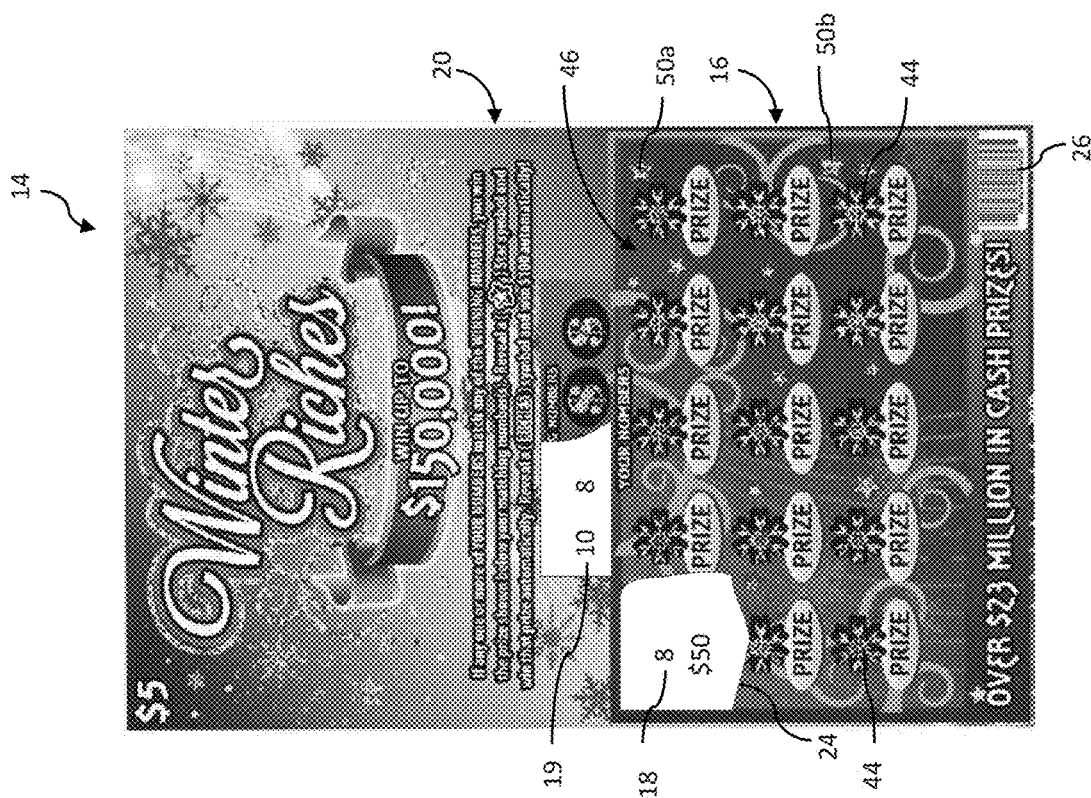
FIG. 2 depicts an alternate embodiment of a scratch-off lottery ticket that may be used with the methods according to the present invention.

Referring to FIGS. 1 and 2, exemplary lottery tickets 14 are depicted. The lottery ticket 14 includes game instruction graphics and indicia 20 printed thereon that explain to a player how to play the game embodied on the lottery ticket 14, as well as what constitutes a winning ticket and the prize amounts. The game instruction indicia 20 may be considered as "static" indicia in that, for a given common game, it does not change from one lottery ticket 14 to the other within the run of lottery tickets 14.

Still referring to FIG. 1, as is well-known, each lottery ticket 14 includes a game play area 16 wherein variable game play indicia 18 is provided and covered by a scratch-off coating (SOC) layer 24. The player must eventually remove the SOC layer 24 to uncover the underlying game play indicia 18, which is compared to the characters 19 in the "winning numbers" section of the lottery ticket 14 (also covered by a SOC layer 24).

Each lottery ticket 14 includes an identifier code 26 printed thereon that is unique to the lottery ticket 14, such as a scannable barcode (as depicted in the figures) or alphanumeric code. This code 26 may be a validation code that links or associates the lottery ticket 14 to a ticket-specific computer file 32 (a validation file) at a central lottery computer 34 (FIG. 3), as described in greater detail below. This code 26 may also be covered by a SOC layer 24. Those skilled in the art appreciate that the validation file contains ticket-specific information for validation and pay-out (redemption) of the lottery ticket 14. The lottery ticket 14 may include a separate unique serial number or code as well.

It should be appreciated that the theme of the game embodied by the lottery tickets 14, the game rules, the type of game play characters 18 and winning characters 19 are not a limiting feature of the present invention, and that the invention is applicable to virtually any type, style, or configuration of scratch-off lottery ticket 14.

Figure 3:
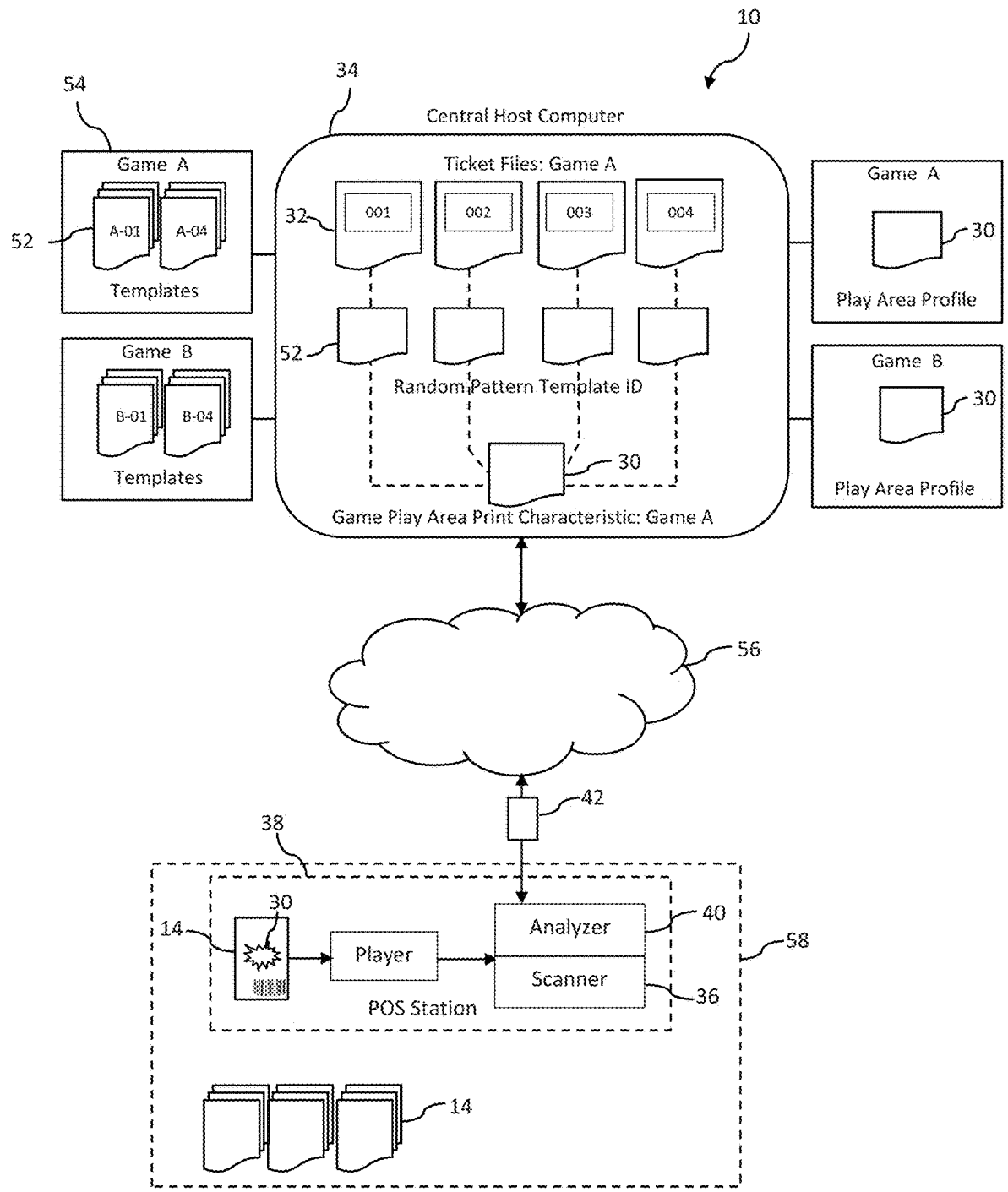
FIG. 3 is a diagram of a system and method configuration according to an embodiment of the invention.

Referring to FIG. 3, at a retail establishment 58, the lottery tickets 14 are provided in a manner accessible to the players without intervention or assistance from a retail clerk, wherein the player physically retrieves the lottery ticket 14 of their choice and presents the lottery ticket 14 to a point-of-sale ("POS") station 38 for purchase. For example, the lottery tickets 14 may be provided on a rack in an aisle within the retail establishment 58 remote from the POS station 38. In this manner, the clerk at the POS station 38 need not be involved with the player's initial selection of a lottery ticket.

Embodiments of the present method providing a print characteristic 30 (FIG. 3) in the game play area of the lottery ticket 14 that is optically detectable upon scanning but not reproducible when photocopying the game play area 16. There are different embodiments of this print characteristic 30 within the scope of the invention. As mentioned, this print characteristic 30 is selected to deter a potential fraudster from making photocopies of illicitly obtained lottery tickets 14 with the intent of submitting a photocopy of a pre-screened winning ticket 14 for purchase. Identification of the print characteristic 30 is linked to the computer file 32 associated with the particular lottery ticket 14 at the central lottery computer 34.

The particular print characteristic 30 may be one or a combination of different properties. In the embodiment depicted in FIGS. 1 and 2, the print characteristic is the reflective property provided by the use of metallic film or metallic ink 44 used to overprint certain indicia or characters on the SOC layer 24. For example, metallic ink or film 44 renders the snowflakes and other indicia in the game play area 16 highly reflective. This print characteristic 30 is not reproducible by simply photocopying the lottery ticket 14. The photocopied image will present a certain color or shade in the areas of the metallic ink or film 44, but such areas will not be reflective. The reflectivity will present itself in conventional optical scanning processes (with scanner 36) wherein light is shined on the lottery ticket being digitized and reflected (usually through a series of mirrors and lenses) onto a photosensitive element, such as a light-sensing integrated circuit known as a charged coupled device (CCD). The amount of light reflected onto the photosensitive elements will be significantly greater than that from a copy of the lottery ticket without the reflective properties in the game play area 16. The amount of reflected light can serve as a measure of the authenticity of the lottery ticket 14. For example, a threshold light detection functionality can be integrated with the scanner 36 to detect the amount of light that should be reflected from the reflective surfaces 44 of the lottery ticket 14. A photocopied ticket presented for purchase/scanning will fail the reflectivity test and can be summarily rejected by the central lottery computer 34 at this stage in the purchase process.

As mentioned, in other embodiments, the print characteristic 30 may be provided by an "invisible ink" that is not visual in the game play area 16 by the naked eye, but reveals itself upon being activated in the scanning process that generates a scanned image 42 of the lottery ticket 14. An example of such an ink is a phosphorescent ink that is activated by absorbing the light in the scanning process from scanner 36. Various types of invisible inks (also referred to as "security inks") are well-known, such as heat activated inks, and can be used in the present methods. In general, such inks are used to produce writing or images that cannot be seen until the lottery ticket 14 is heated, treated, or otherwise activated during or prior to the scanning process. Again, a detection functionality can be integrated with the scanner 36 to detect that the activated feature is present on the scanned ticket 14.

The print characteristic 30 may, in certain embodiments, be printed on the SOC layer 24 that covers all or a portion of the game play area 16 on the scratch-off lottery ticket 14. Alternately, the print characteristic 30 may be printed in a section of the game play areal 6 that is not covered by the SOC layer 24.

In still other embodiments, verification of the print characteristic may be conducted by analysis of the scanned image 42 of the lottery ticket 14. For example, the scanned image 42 may include the invisible ink marks or indicia in the game play area 16 activated by the scanning process, or may depict brighter areas in the game play area 16 from the reflective material 44 as compared to the scanned image 42 of a copy of the lottery ticket 14.

The different print characteristics 30 may be defined by a quantitative measurable value, such as a magnitude of reflected light, surface area containing an invisible ink, and so forth. Alternatively, the print characteristic 30 may be determined based on a comparison of the scanned image 42 to a "master" scan image. In general, any distinguishing information that can be used to confirm the presence of the print characteristic 30 on the lottery ticket 14 at the scanner 36 or at the central lottery 34 computer based on the scanned image 42 is contemplated.

Referring to FIG. 3, in a particular embodiment, the print characteristic 30 may be common to all of the lottery tickets 14 belonging to a common game. For example, all of the tickets 14 in the common "Game A" may have the same reflectivity value, while all of the tickets 14 in the common "Game B" may have a different reflectivity value, or a completely different print characteristic 30 altogether.

Identification of the particular print characteristic 30 assigned to a particular lottery ticket 14 can be individually stored in the ticket-specific computer file 32 at the central lottery computer 34. In an alternate embodiment, referring to FIG. 3, the print characteristics 30 assigned to the respective different common games are stored in a memory/database 55 remote from the ticket files 32. The unique serial number or code 26 on each ticket 14 links the ticket to correct print characteristic 30 file in the database 55, which is accessed and retrieved by the central host computer 34. The print characteristic 30 may be transmitted by the computer 34 to an analyzer 40 configured with the scanner 36 (which includes an analyzer function integrated with the scanner 36) for verification directly at the POS station 38, or the verification may be conducted at the central host computer 34 based on the scanned image 42.

The method 10 further includes, in the game play area 16, providing an optically scannable random identifier that is assigned to the lottery ticket 14, and linking the random identifier to the lottery ticket 14 in the computer file 32. This random identifier is not readily, visually, discernable such that a person unaware of the use of such identifiers would not likely be able to discern one lottery ticket 14 from another (in the same lottery game) based on the random identifier by simple visual inspection of the lottery tickets 14. In other words, without prior knowledge that such random identifiers are even integrated into the game play area 16 (and the specific type of random identifier), a person viewing tow tickets 14 side-by-side would not be able to discern the different random identifiers used to distinguish one ticket 14 from the other. As mentioned, this feature of the lottery tickets 14 makes it possible to detect if a potential fraudster has cut out the game play area 16 from one ticket 14 and attached it over the game play area 16 of an illegally pre-screened winning ticket 14 in an attempt to fool the system into "seeing" an original untampered lottery ticket 14.

The type and application of the random identifier may vary widely within the scope and spirit of the invention. Referring to FIGS. 1 and 2, in certain embodiments, the random identifier may be an alteration in a background image 46 printed in the game play area 16, wherein such alteration is unique to the scratch-off lottery ticket 14. In FIGS. 1 and 2, the background image 46 includes patterns of lines, stars, and color changes. The alternation to this background image 46 may be a slight change in the color scheme or pattern, or the presence or absence of a mark or indicia in the background image 46, as compared to other lottery tickets 14 within the common lottery game.

For example, comparing FIGS. 1 and 2, the background image 46 in the ticket 14 of FIG. 1 includes "stars" 50a and 50b that are not present in the background image 46 in FIG. 2. The background image 46 in the ticket 14 of FIG. 2 includes pattern additions 48a and 48b and a star 50c that are not present in the background image 46 of the ticket 14 in FIG. 1.

In one embodiment, the method 10 includes storing an image of the game play area 16 (with its unique random identifier) in the computer file 32 associated with the particular lottery ticket 14 at the central lottery computer 34. Alternatively, an image of the game play area 16 (with the random identifier) may be stored separate from the computer file 32 (e.g., in a remote storage/database 54) and linked to the unique serial number 26 on the ticket 14, wherein the image is accessed by the central computer 34 to conduct the verification process upon receipt of the scanned image 42.

Figure 4:
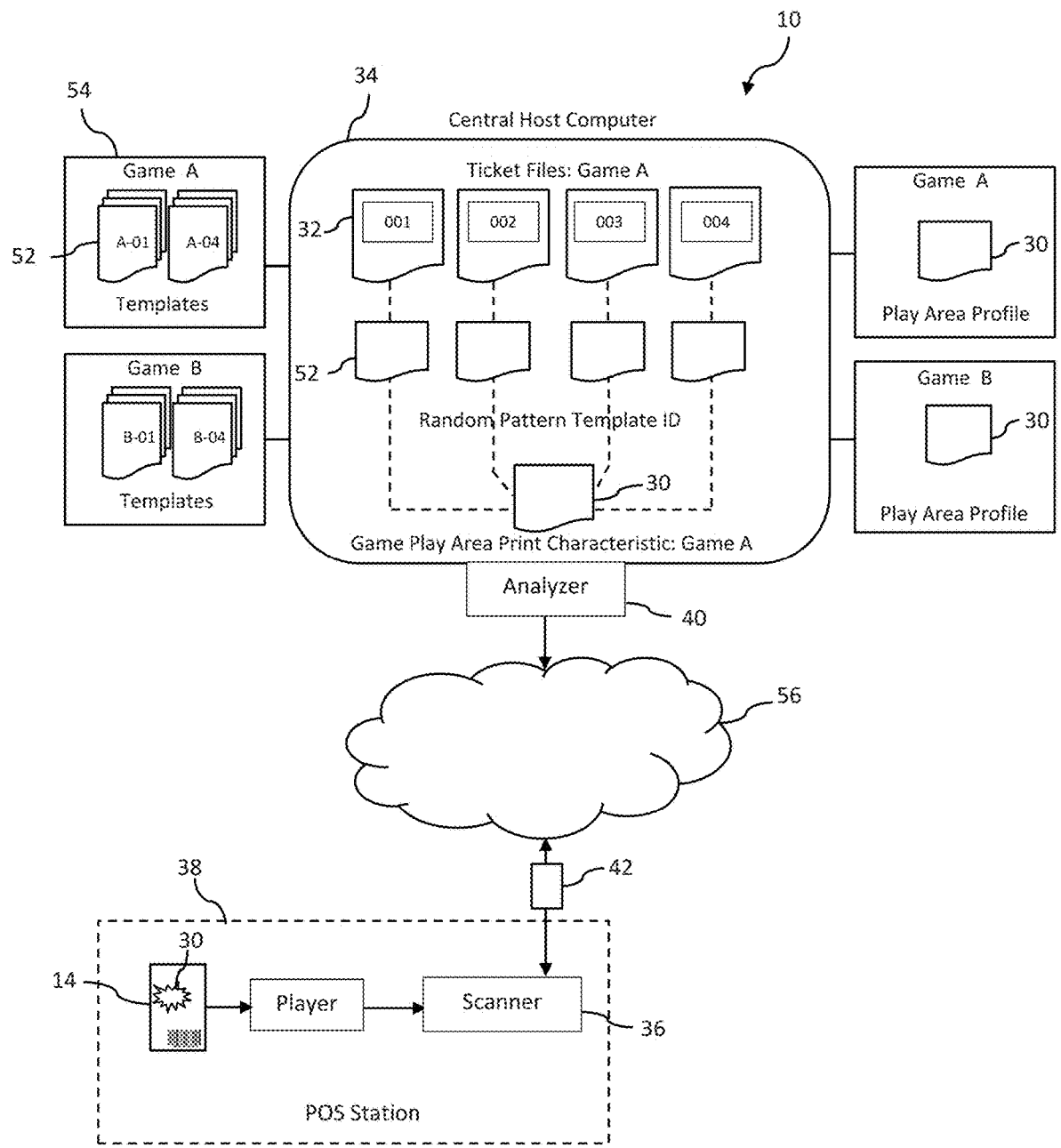
FIG. 4 is a diagram of an alternate system and method configuration according to an alternate embodiment of the invention.

In a particular embodiment depicted in FIGS. 3 and 4, a plurality of game play area templates 52 are produced for a particular common game. For example, a "Lucky 7" common game (having a defined number of the scratch-off lottery tickets 14 printed for such common game) may have ten different game play area templates 52 generated therefor, wherein each respective template 52 has a different one or combination of the random identifiers. For example, one such template 52 may include the background image 46 of FIG. 1, and another template 52 may include the background image 46 of FIG. 2, and so forth. At the time of printing the lottery tickets 14, one of the game play area templates 52 is assigned to each lottery ticket 14 in a random or defined order. The identity of the template 52 assigned to the ticket 14 is linked to the unique serial number or code 26 in the computer file. To conduct the random identifier verification, the central computer 34 accesses the template 52 associated with the ticket 14 based on the serial number or code 26.

Thus, upon presentation of the scratch-off lottery ticket 14 for purchase at the POS location 38, the method includes performing one or more of the print characteristic 30 or random identifier verifications. First, the ticket 14 is scanned and analyzed to verify that the print characteristic 30 is present. As discussed above, this analysis may be based on a process carried out by the scanner 36 and/or analyzer 40 (e.g., detection of a threshold amount of reflected light or detection of an activated invisible ink) or based on an analysis conducted on the scanned image 42. Second, the scanned image 42 of the lottery ticket 14 may then be analyzed to verify that the random identifier assigned to the scratch-off lottery ticket 14 is present in the game play area 16 of the scanned image.

The scanner 36 at the POS station 38 is used to generate the scanned image 42 upon presentation of the lottery ticket 14 for purchase by a player. As mentioned above, the scanner 36 is in communication with the central lottery computer 34 and may receive the identification of the print characteristic 30 associated with the ticket 14, wherein the process of analyzing the ticket or the scanned image 42 to verify presence of the print characteristic 30 is done by an analysis functionality 40 configured with or separate from the scanner 36.

In addition, with the embodiment depicted in FIG. 3, the stored image of the game play area (with respective random identifier) is saved in or associated with the ticket-specific computer file 32 and may be transmitted by the central lottery computer 34 to the scanner/analyzer 40 for verification by the scanner/analyzer 40 that the random identifier assigned to the scratch-off lottery ticket 14 is present in the game play area 16 of the scanned image 42.

In an alternate embodiment depicted in FIG. 4, the scanner 36 at the POS station 38 generates and transmits the scanned image 42 of the lottery ticket 14 to the central lottery computer 34, wherein an analyzer functionality 40 verifies that the print characteristic 30 and the random identifier assigned to the scratch-off lottery ticket 40 are present in the game play area 16 of the scanned image 42.

It should be appreciated that the resent invention also encompasses scratch-off lottery tickets 14 that embody the characteristics discussed, wherein such tickets 14 are particularly suited for presentation to potential consumers at a location in a retail establishment 58 remote from the POS station 38.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for providing scratch-off lottery tickets for sale remote from a point-of-sale (POS) location in a retail establishment, the method comprising:
    configuring the scratch-off lottery tickets with a game play area having play characters covered by a scratch-off coating;
    on the scratch-off coating in the game play area, providing a print characteristic that is optically scannable but not reproducible when photocopying the game play area;
    in a database, linking an identification of the printed characteristic in a computer file associated with the scratch-off lottery ticket at a central lottery computer;
    on the scratch-off coating, providing an optically scanable random identifier that is assigned to the scratch-off lottery ticket, the random identifier comprising an alteration of a background image printed on the scratch-off coating such that the background image is unique to the scratch-off lottery ticket, and linking the random identifier to the scratch-off lottery ticket in the computer file;
    upon presentation of the scratch-off lottery ticket for purchase:
        with a scanner, obtaining a scanned image of the scratch-off lottery ticket that includes the game play area with the scratch-off coating;
        analyzing the scratch-off lottery ticket or the scanned image and verifying that the print characteristic is present in the scanned image; and
        analyzing the scanned image and verifying that the random identifier linked to the scratch-off lottery ticket in the computer file is present in the scanned image.

2. The method of claim 1, wherein the print characteristic is reflectivity.

3. The method of claim 2, wherein the reflectivity is provided by a metallic film or metallic ink.

4. The method of claim 1, wherein the print characteristic is presence of a non-visually detectable ink.

5. The method of claim 4, wherein the non-visually detectable ink is activated to a detectable state in a scanning process that generates the scanned image.

6. The method of claim 1, wherein the identification of the print characteristic is stored separate from the computer file and linked to a unique serial number or code provided on the scratch-off lottery ticket.

7. The method of claim 1, wherein the alternation is the presence or absence of a mark or indicia in the background image.

8. The method of claim 1, wherein the alternation is a change in a pattern used in the background image.

9. The method of claim 1, wherein an image of the game play area with scratch-off coating and the random identifier is saved in the computer file.

10. The method of claim 1, wherein an image of the game play area with scratch-off coating and the random identifier is stored separate from the computer file and accessed when verifying the scanned image for the random identifier.

11. The method of claim 10, wherein the stored image is linked to a unique serial number or code provided on the scratch-off lottery ticket.

12. The method of claim 11, wherein a plurality of game play area with scratch-off coating templates are produced, with each of the templates comprising a different one or combination of the random identifiers, upon printing of the game play area with scratch-off coating on the scratch-off lottery tickets, one of the templates is assigned to the scratch-off lottery ticket and identity of the template is linked to the unique serial number or code in the computer file.

13. The method of claim 1, wherein a scanner at the POS station generates the scanned image of the scratch-off lottery ticket, the scanner in communication with the central lottery computer for receipt of the identification of the print characteristic from or associated with the computer file, wherein the analyzing of the scratch-off lottery ticket or the scanned image of the scratch-off lottery ticket to verify presence of the print characteristic is done by an analysis functionality configured with the scanner.

14. The method of claim 13, wherein an image of the game play area with scratch-off coating and the random identifier is saved in the computer file or is accessible by the central lottery computer and transmitted by the central lottery computer to the scanner for verification by the scanner that the random identifier assigned to the scratch-off lottery ticket is present in the play area of the scanned image.

15. The method of claim 1, wherein the scanner at the POS station generates and transmits the scanned image of the scratch-off lottery ticket to the central lottery computer for verification by the central lottery computer of the print characteristic and that the random identifier assigned to the scratch-off lottery ticket is present in the scanned image.

* * * * *